(12) United States Patent
Stojkovic et al.

(10) Patent No.: US 9,816,544 B2
(45) Date of Patent: Nov. 14, 2017

(54) METHOD OF FORMING A GROUNDING POINT ON AN ALUMINUM MEMBER

(71) Applicant: Ford Global Technologies, LLC, Dearborn, MI (US)

(72) Inventors: Dragan B. Stojkovic, Taylor, MI (US); Michael William Danyo, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 544 days.

(21) Appl. No.: 14/314,905

(22) Filed: Jun. 25, 2014

(65) Prior Publication Data

US 2015/0375694 A1    Dec. 31, 2015

(51) Int. Cl.
| | |
|---|---|
| *F16B 25/00* | (2006.01) |
| *B60R 16/06* | (2006.01) |
| *B21D 26/035* | (2011.01) |
| *B21J 5/06* | (2006.01) |
| *B21D 53/88* | (2006.01) |

(Continued)

(52) U.S. Cl.
CPC ........ *F16B 25/0021* (2013.01); *B21D 26/035* (2013.01); *B21J 5/066* (2013.01); *B60R 16/06* (2013.01); *B21D 53/88* (2013.01); *F16B 5/02* (2013.01); *F16B 25/106* (2013.01); *F16B 37/005* (2013.01)

(58) Field of Classification Search
CPC .... F16B 25/0021; B21D 26/035; B21J 5/066; B60R 16/06; H01R 13/648; H01R 13/652; H01R 13/658
See application file for complete search history.

(56) References Cited

U.S. PATENT DOCUMENTS

| | | |
|---|---|---|
| 6,401,507 B1 | 6/2002 | Kreek et al. |
| 6,442,820 B1 | 9/2002 | Mason |

(Continued)

FOREIGN PATENT DOCUMENTS

| | | | | |
|---|---|---|---|---|
| CN | 101274344 A | 10/2008 | | |
| EP | 0507347 A2 * | 10/1992 | ............. | H01R 25/14 |

(Continued)

OTHER PUBLICATIONS

EJOT FDS, The Self piercing and extruding screw and high-strength sheet joints, May 1992.

(Continued)

*Primary Examiner* — Peter DungBa Vo
*Assistant Examiner* — Jeffrey T Carley
(74) *Attorney, Agent, or Firm* — Jason Rogers; Brooks Kushman P.C.

(57) ABSTRACT

A method of providing an electrical grounding point on an aluminum structural member of a motor vehicle. The member is hydro-formed to produce a closed cross-section, after which a hole surrounded by a flange is formed in a wall of the member. The flange is generally the shape of a truncated cone and extends toward an interior of the member. A self-tapping fastener having a grounding lead attached thereto is driven into the hole to cut threads into the flange and secure the grounding lead to the member. The self-tapping fastener allows the grounding connection to be achieved without any access to the hollow interior of the member as would otherwise be required.

6 Claims, 5 Drawing Sheets

(51) Int. Cl.
*F16B 5/02* (2006.01)
*F16B 25/10* (2006.01)
*F16B 37/00* (2006.01)

(56) References Cited

U.S. PATENT DOCUMENTS

| | | | |
|---|---|---|---|
| 6,931,901 B2 * | 8/2005 | Ghiran | B21D 28/28 29/421.1 |
| 7,503,198 B1 | 3/2009 | Ghiran et al. | |
| 7,735,209 B2 | 6/2010 | Diehl et al. | |
| 8,545,157 B2 | 10/2013 | Golovashchenko | |
| 2002/0119686 A1 | 8/2002 | Baginski | |
| 2005/0081589 A1 | 4/2005 | Ghiran et al. | |
| 2006/0065030 A1 | 3/2006 | Ghiran et al. | |
| 2008/0018139 A1 | 1/2008 | Caliskan et al. | |
| 2008/0079308 A1 * | 4/2008 | Kretschmer | B60B 35/16 301/124.1 |
| 2008/0168817 A1 | 7/2008 | Ghiran et al. | |
| 2009/0044584 A1 | 2/2009 | Wilkes et al. | |
| 2010/0008737 A1 | 1/2010 | Ghiran et al. | |
| 2010/0031722 A1 | 2/2010 | Mizumura et al. | |

FOREIGN PATENT DOCUMENTS

| | | |
|---|---|---|
| JP | 2005297060 A | 10/2005 |
| KR | 20120071664 A | 7/2012 |

OTHER PUBLICATIONS

EJOT FDS, The flow drill screw for high strength sheet metal joints, EJOT The Quality Connection, Feb. 2010.

Singh, Harjinder, Fundamentals of Hydroforming, Society of Manufacturing Engineers, Copyright 2003.

* cited by examiner

METHOD OF FORMING A GROUNDING POINT ON AN ALUMINUM MEMBER

TECHNICAL FIELD

This disclosure relates to hollow aluminum structural members such as are used in the manufacture of a pick-up truck. Specifically, the disclosure relates to a method of forming an electrical grounding connection with such a hollow aluminum member.

BACKGROUND

Pickup trucks are motor vehicles with a front passenger area, often referred to as a cab, and an open top rear cargo area, often referred to as a box. The box usually has a substantially flatbed from which two sidewalls and a forward interconnecting headboard extend upwardly therefrom. Pickup trucks may also employ a bottom hinged door, commonly referred to as a tailgate, hinged at the rear edge of the bed and closable to provide a fourth (rear) wall for the cargo area. The cab and box may be separate assemblies or part of the same uni-body structure. Pickup trucks are popular largely because the box allows them to be utilized in so many different ways, including carrying a variety of types of cargo and towing various types of trailers.

Traditionally the majority of body structures on pickup trucks have been formed from steel alloys. Through years of experience, pickup truck designers have learned how to engineer steel truck body parts that withstand the variety of demanding pickup truck applications. The current regulatory and economic environment have increased the importance of making pickup trucks more fuel efficient as well as functional and durable. One way to reduce the fuel consumption of a vehicle is to reduce vehicle structure weight.

Aluminum alloys typically have a higher strength-to-weight ratio than steel alloys. Consequently, replacing steel with aluminum offers the potential for weight reduction. However, the elastic modulus of aluminum is generally lower than the elastic modulus of steel. As well, fabrication techniques and methods of joining parts that work well for steel parts may not work well for the same aluminum part. Due to these and other differences, simple material substitution does not necessarily produce an acceptable design.

Hydro-forming has been found to be an effective and economical method for forming aluminum structural members having the required balance between high strength and low weight.

Electric system, circuits, and components of automotive vehicles must be electrically grounded for proper and safe operation. A grounding point may be conveniently provided on a metal structural component of the vehicle, for example on a frame or body component. In a typical automotive application, a grounding wire, cable, or strap connected with the electrical component or circuit being grounded terminates in an eyelet or similar element that is secured to the grounding point on the metal component using a bolt and nut.

When the structural component is formed of steel, it is often practical to weld the nut to the wall of the structural member on the surface opposite from the direction of insertion of the grounding bolt and in alignment with a hole in the wall. The bolt is then passed through the grounding eyelet, inserted through the grounding hole in the wall of the member, and tightened into threaded engagement with the captive nut thereby clamping the grounding eyelet against the wall. The grounding eyelet has sufficient surface area and is clamped against the metal component (by means of the bolt being tightened into the nut) with sufficient force to establish good electrical continuity.

If the structural member providing the grounding point has a hollow or closed cross-section, the nut can only be secured at the necessary location (inside the hollow section, on the back side of the wall having the grounding hole) if an access hole is formed in the wall of the member opposite from the wall in which the grounding hole is formed. Such an access hole may weaken the member, and forming the access hole may require additional fabrication and assembly steps which add cost and complexity to the vehicle assembly process.

U.S. Pat. No. 6,931,901 B1 teaches forming a threaded hole in a hydro-formed steel part while the part is still in a hydro-forming die cavity. This requires a tool which pierces a hole through a wall of the part, forces or extrudes the wall material to form an annular region extending inward from the part while expanding the hole to a desired diameter, and subsequently cuts threads into the interior of the annular region. Such a procedure requires a specialized fixture and piercing/sizing/threading tool and therefore adds considerably to the fabrication cost of the member. Such a procedure is also poorly suited for an aluminum structural member because of the relatively high likelihood of cross-threading and/or stripping of the threads when a fastener is driven into engagement with the threads.

It would be desirable to provide a method for providing an electrical ground that is more applicable to a member formed of hydro-formed aluminum and eliminates the need to access the hollow interior of a closed cross-section.

SUMMARY

In a first disclosed embodiment, a method of securing a grounding lead to an aluminum structural member of a motor vehicle comprises hydro-forming the member to form a closed cross-section, forming a hole in a wall of the member with a truncated-conical flange extending toward an interior of the member, and driving a self-tapping fastener into the hole to engage and cut threads into the flange. The fastener has a grounding lead secured thereto which may then be attached to an electric circuit or device to be grounded. The self-tapping fastener allows the grounding connection to be achieved without any access to the hollow interior of the member as would otherwise be required.

In another disclosed embodiment, a method of providing an electrical grounding point on an aluminum member of a motor vehicle comprises hydro-forming the member to produce a closed cross-section, forming a hole surrounded by a flange in a wall of the member, the flange extending toward an interior of the member, and driving a self-tapping fastener into the hole to cut threads into the flange, the fastener having a grounding lead attached thereto.

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
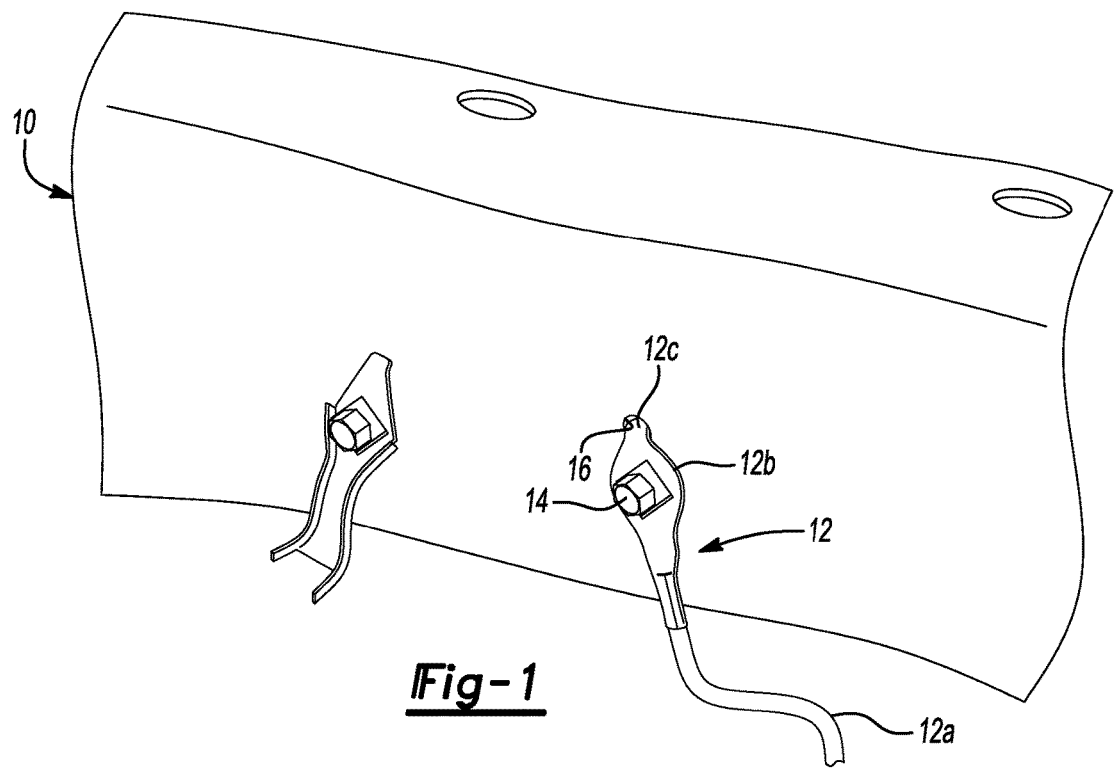
FIG. 1 is a partial perspective view of an aluminum structural member having a closed cross-section and a grounding lead attached thereto by a grounding bolt.

In FIG. 1, an aluminum member 10 is a structural component used in the manufacture of a motor vehicle. Member 10 may, for example, be a component of the frame, bed, or cab structure of a pick-up truck. An electrical grounding point for an electrical component or circuit (not shown) of the vehicle is provided on the member 10 by securing a grounding lead 12 to the member by a self-tapping fastener 14. In the disclosed embodiment, grounding lead 12 comprises a conductor 12a which terminates in an eyelet 12b, and the fastener 14 passes through the eyelet. The end of the conductor 12a distal from eyelet 12b is attached to an electrical component or circuit being grounded (not shown). Conductor 12a may comprise a wire, cable, or strap as is well known in the art.

Grounding eyelet 12b may have an anti-rotation tab 12c formed integrally therewith, the tab engaging a corresponding notch, depression, or hole 16 in the member 10 when the eyelet is clamped against the member by the fastener 14.

Figure 2:
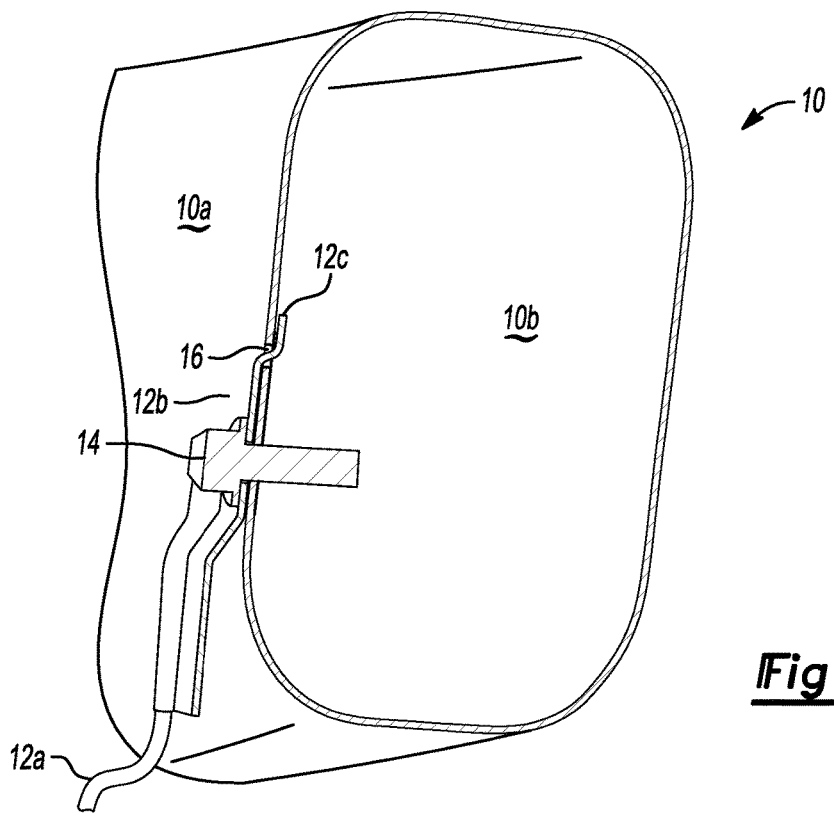
FIG. 2 is a cross-section taken along line 2-2 of FIG. 2.

As best seen in FIG. 2, member 10 has a closed cross-sectional shape such as may be formed in a hydro-forming process, as is well known in the art. In the disclosed embodiment, member 10 is generally rectangular in cross-section. This is by way of example only, as the present method is applicable to a member of any hollow or closed shape. The term "closed cross-section" as used herein refers to a hollow shape such that access the hollow interior of the member is largely blocked. The term does not negate the possibility that the member may have holes, slots, windows, or other openings in one or more of its walls, as may be necessary for reasons of proper design function and/or fabrication of the member.

As is apparent from FIG. 2, there is no opening in the wall 10b opposite from fastener 14 that would allow access to the rear/interior side of wall 10a by a tool (not shown) required to weld or otherwise secure a nut to the wall 10a and/or to permit a nut to be threaded into engagement with the bolt.

Figure 3:
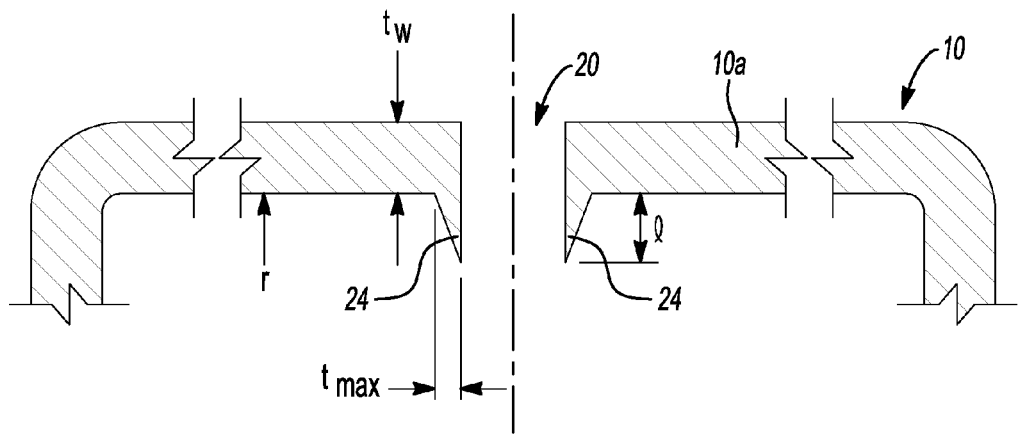
FIG. 3 is an enlarged cross-section taken through the frame member prior to insertion of the bolt.

Referring now to FIG. 3, an enlarged cross-section of a portion of member 10 illustrates a hole 20 formed in wall 10a of the member 10 prior to receiving a self-tapping fastener. An annular flange 24 surrounds the hole 20 and projects from the rear side r of the wall 10a into the hollow interior of the member. The flange 24 has a truncated cone-shaped cross-section, with a maximum thickness $t_{max}$ at its root (the end of the flange adjacent to wall 10a) and gradually decreasing in thickness toward the end of the flange distal from the wall 10a. The flange 24 is formed by material of wall 10a that is displaced inwardly as hole 20 is formed. The inner surfaces of hole 20 and flange 24 are of a constant diameter and are substantially smooth (not threaded). The maximum flange thickness $t_{max}$ is substantially smaller than the thickness $t_w$ of wall 10a.

Figure 4:
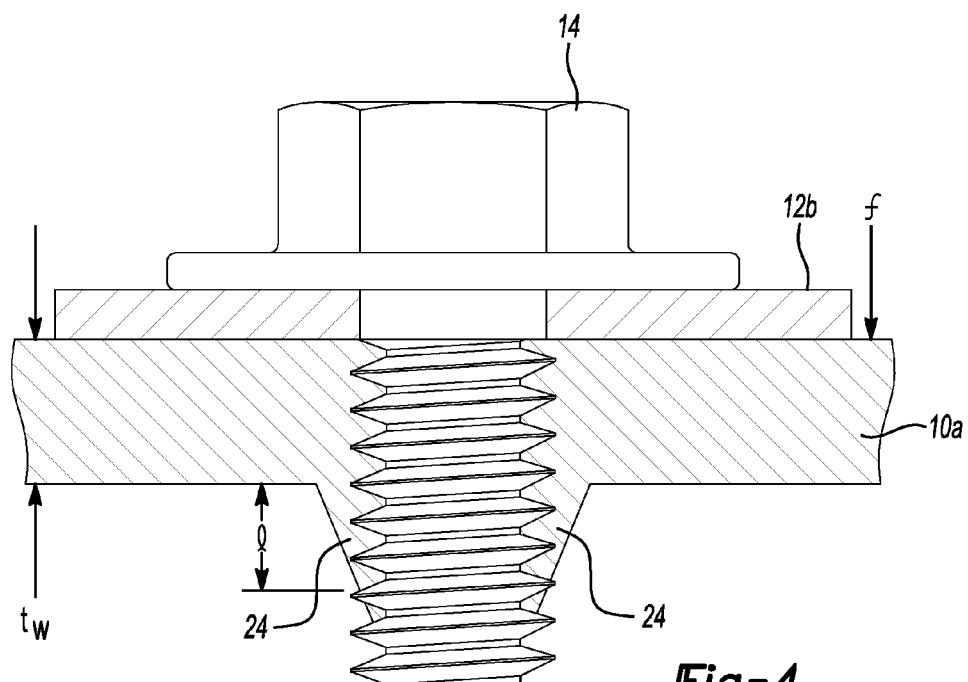
FIG. 4 is a cross-section view taken through with a self-tapping fastener installed in the hole.

As seen in FIG. 4, self-tapping fastener 14 is driven into hole 20 from the exterior of member 10, cutting threads into the inner surface of the hole 20 and flange 24 as it is driven so that the fastener engages the wall and flange to hold the eyelet 12b in contact with the front surface f of wall 10a. The axial length l of flange 24 provides additional thread engagement length to that available solely from wall thickness $t_w$, thereby providing more secure mechanical connection and better electrical continuity (due to the increased contact surface area) between the fastener and the member 10.

The hole 20 and flange 24 may be formed while member 10 is still retained in the hydro-forming die cavity, or in a separate machining step or steps performed after the member 10 is removed from the hydro-forming dies. Hydro-piercing and flow drilling (also known as thermal friction drilling and flow punch forming) are believed to be appropriate processes. Preferably, the process used to form hole 20 and flange 24 does not produce any chips or slugs that separate from the member 10.

Figure 5:
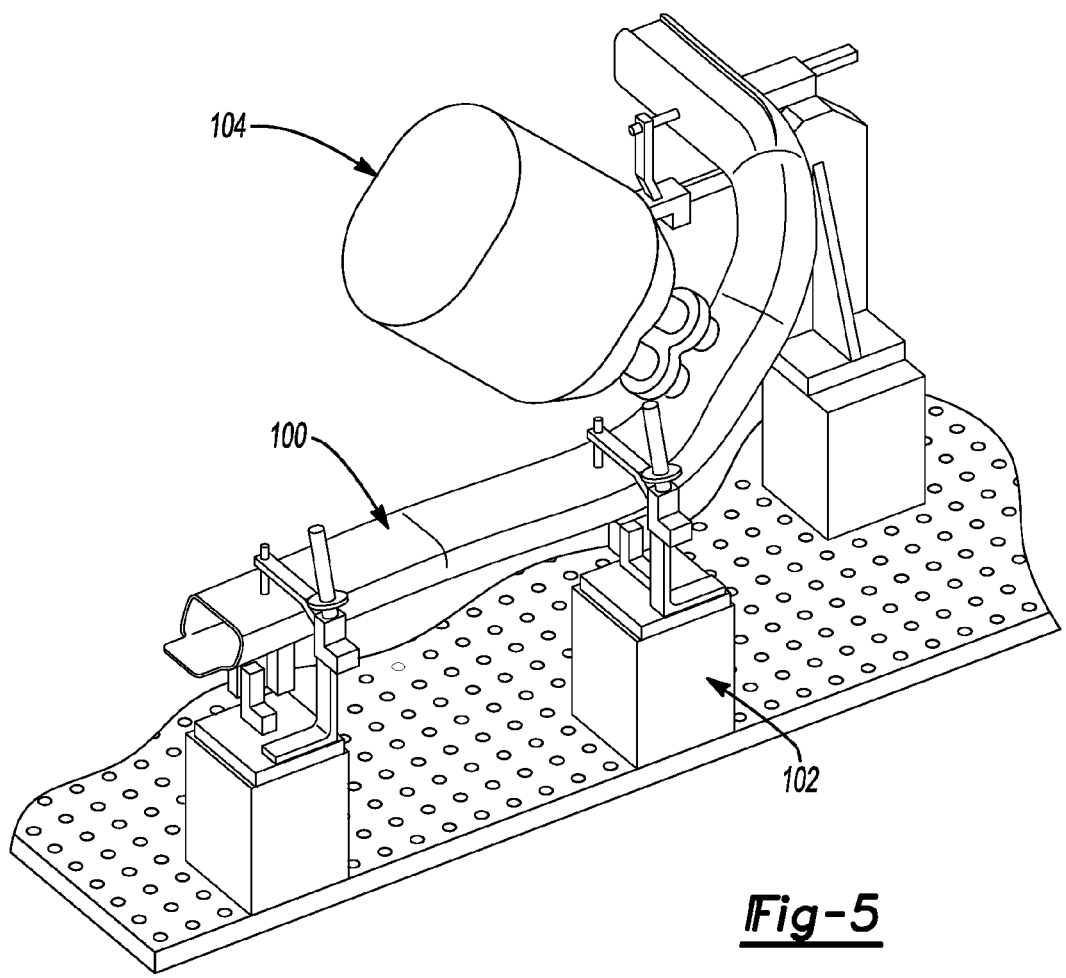
FIG. 5 is a simplified, schematic view of a frame member held by a flow-drilling fixture.

FIG. 5 is a simplified, schematic depiction of a hollow frame member 100 secured in a machining fixture 102, after it has been removed from the hydro-forming dies (not shown). A dual-bit flow-drill press 104 is positioned to form two closely-adjacent grounding holes.

Figure 6A:
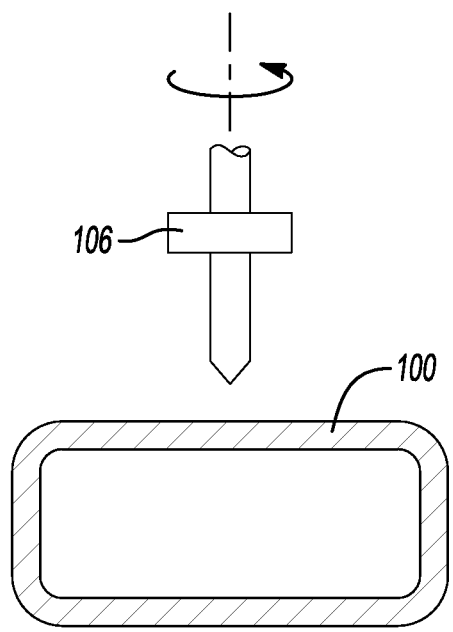
FIGS. 6A-6C are simplified schematic views of a flow-drilling bit process.
Figure 6B:
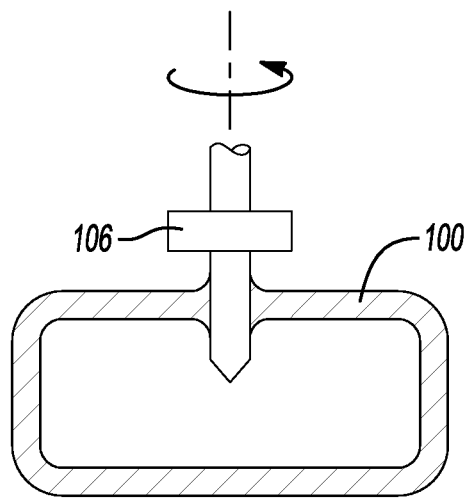
Figure 6C:
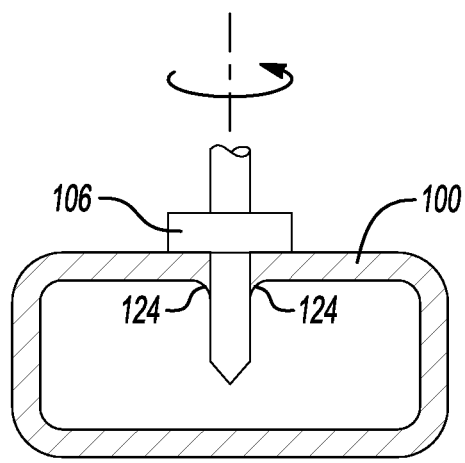

FIGS. 6A-6C show (in simplified, schematic form) a flow-drilling bit 106 in the process of forming a hole with inward-projecting flange 124 in member 100.

Figure 7:
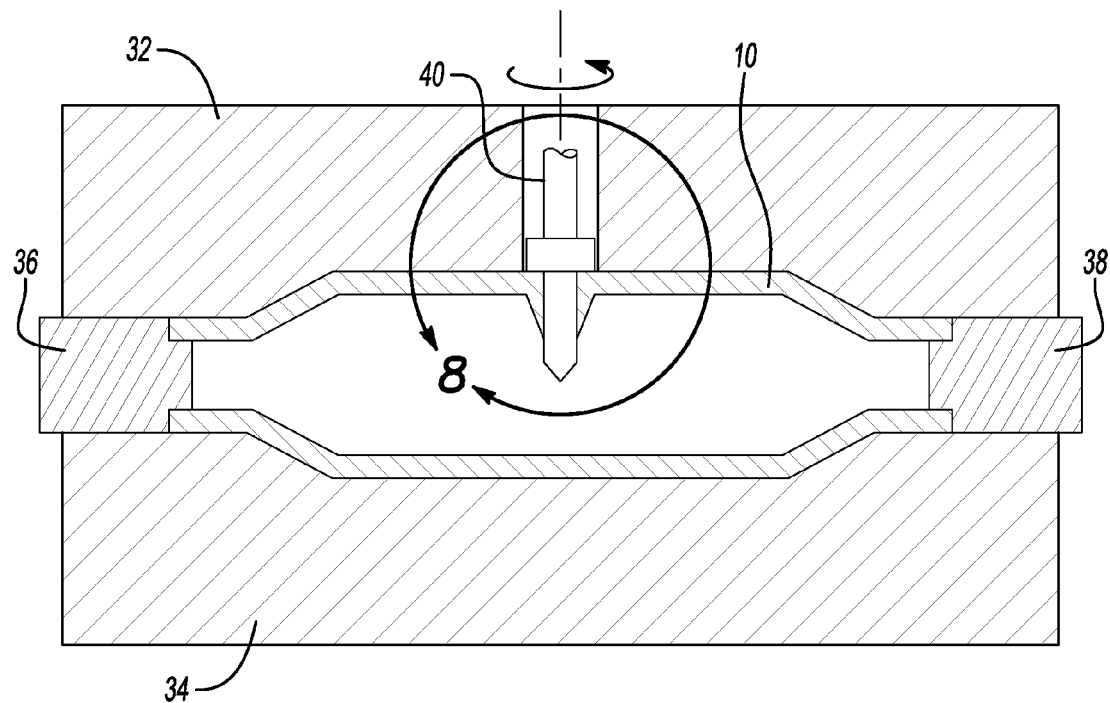
FIG. 7 is a general schematic view of a member after forming in a hydro-forming die set.
Figure 8:
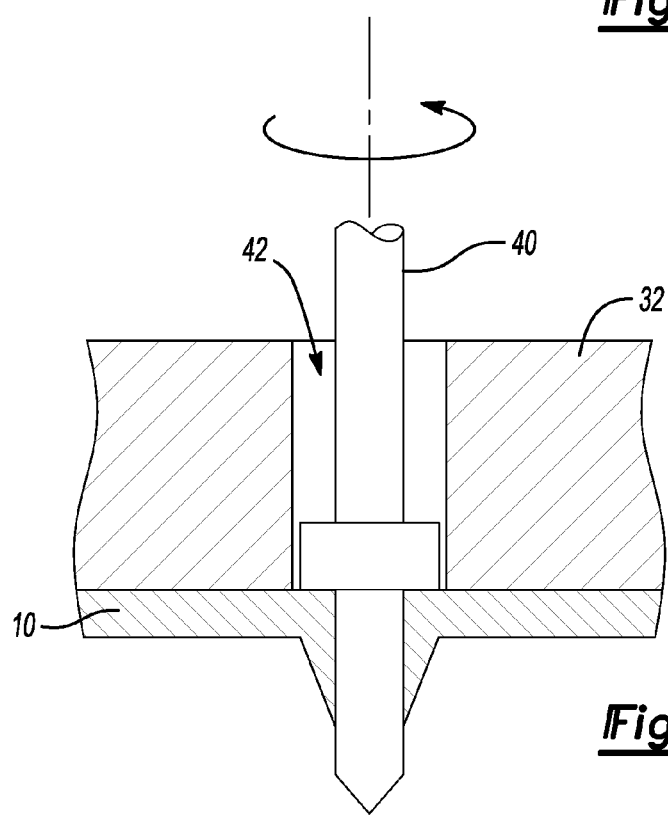
FIG. 8 is a detail view of FIG. 7 showing a flow drilling bit 40 forming a hole and flange in the member.

FIGS. 7 and 8 are simplified schematic depictions of hydro-forming die set comprising an upper die 32, a lower die 34, a first end plug 36, and a second end plug 38. Member 10 is shown contained in the die cavity after having been hydro-formed. A flow drill bit 40 is shown inserted through a pilot shaft in upper die 32. The flow drill bit 40 is rotated and advanced by a drill press (not shown) to form a hole in the wall of the member.

The disclosed method eliminates the requirement to form an access hole in the wall of the member opposite from the grounding point, as is necessary when a captive nut retains the grounding fastener. It also eliminates the need to form threads in the aluminum member prior to insertion of the fastener, which reduces fabrication cost and complexity and also reduces the likelihood of cross-threading and/or thread damage when the fastener is inserted.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A method of securing a grounding lead to an aluminum member comprising:
   hydro-forming the member to a closed cross-section;
   forming an unthreaded hole in a wall of the member, the hole surrounded by a truncated-conical flange extending toward an interior of the member;

connecting the grounding lead to a self-tapping fastener; and driving the self-tapping fastener into the hole to cut threads into the flange and urge the grounding lead into contact with the member.

2. The method of claim 1, wherein the hole and flange are formed while the member is retained in a hydro-forming die set.

3. The method of claim 1, wherein the hole and flange are formed in a post-hydro-forming machining step.

4. The method of claim 1, wherein the hole and flange are formed by flow drilling.

5. The method of claim 1, wherein the grounding lead comprises a conductor terminated by an eyelet and the step of connecting the grounding lead to the fastener comprises passing the fastener through the eyelet.

6. The method of claim 1, wherein a thickness of the flange has a maximum at a root of the flange and the thickness decreases towards a distal end of the flange.

* * * * *